Patented Apr. 16, 1940

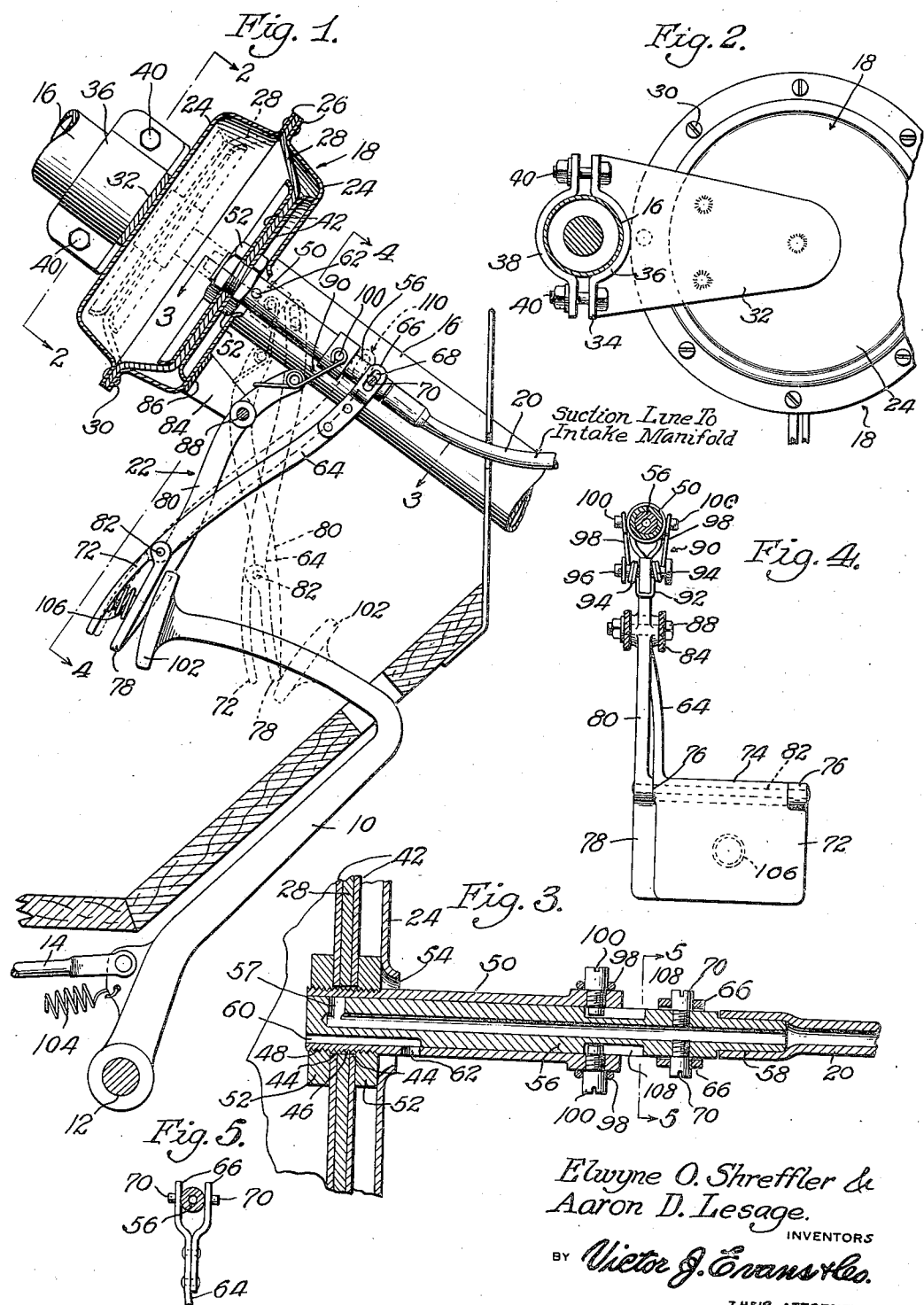

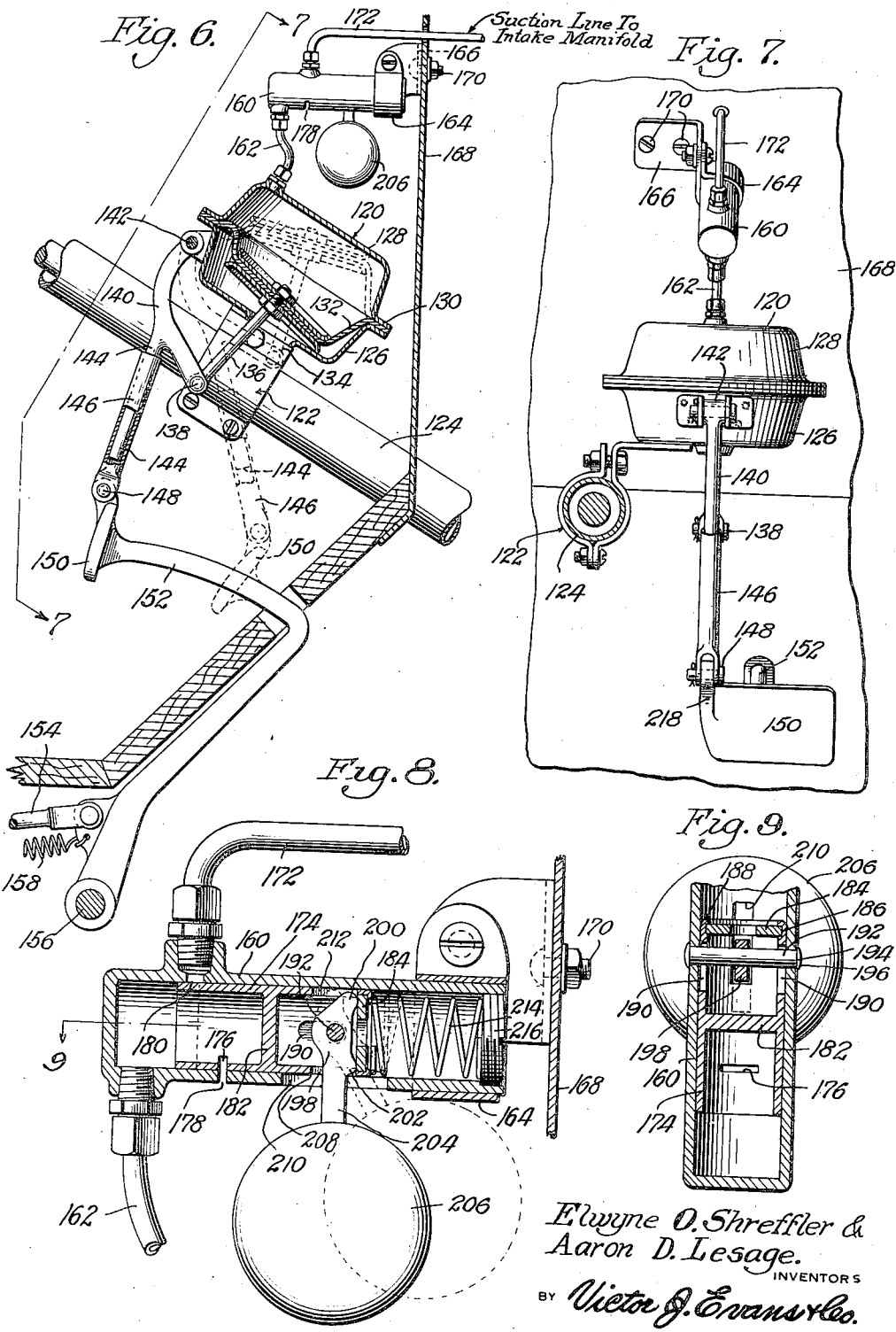

2,197,321

UNITED STATES PATENT OFFICE 2,197,321

BRAKE MECHANISM

Elwyne O. Shreffler and Aaron D. Lesage, Manteno, Ill.

Application May 10, 1937, Serial No. 141,784

9 Claims. (Cl. 188—152)

Our invention relates to brakes and includes among its objects and advantages the provision of an improved power brake unit co-operating in a novel manner with the manually operated brake pedal for brake applying purposes.

In the accompanying drawings:

Fig. 1 is a sectional view of our invention illustrating the power unit attached to the steering post for co-operation with the brake pedal;

Fig. 2 is a sectional view along the line 2—2 of Fig. 1;

Fig. 3 is a sectional view along the line 3—3 of Fig. 1;

Fig. 4 is a sectional view along the line 4—4 of Fig. 1;

Fig. 5 is a sectional view along the line 5—5 of Fig. 3;

Fig. 6 is a sectional view of a different form of construction;

Fig. 7 is a view taken from the position indicated by line 7—7 of Fig. 6;

Fig. 8 is a sectional view of the pendulum valve; and

Fig. 9 is a sectional view along the line 9—9 of Fig. 8.

In the embodiment selected to illustrate our invention we make use of a conventional brake pedal 10 pivotally mounted at 12 and connected with the brake mechanism, not shown, through the medium of a conventional brake rod 14. Upon the steering post 16 we mount a power unit 18 which is operatively connected with the intake manifold (not shown) of the engine of the vehicle through the medium of a conduit 20. A linkage 22 operatively connects the power unit 18 with the brake pedal 10.

Specifically, the power unit 18 comprises drum sections 24 having flanges 26 between which the marginal area of a flexible diaphragm 28 is pinched. Screws or bolts 30 hold the sections 24 in assembled relation. To the outer face of one of the sections 24 we weld a supporting plate 32 terminating in a right-angular bend 34 having a curvature 36 for partly embracing the steering post 16. A clamp member 38 partly embraces the steering post 16 opposite the curvature 36, and the two parts are firmly clamped upon the steering post through the medium of bolts 40. Thus, the power unit 18 is positioned to one side of the steering post 16 and may be shifted longitudinally of the steering post to secure precise location of the unit.

On opposite sides of the diaphragm 28 we position metallic plates 42, which plates are provided with central openings 44 aligned with a central opening 46 in the diaphragm 28 (see Fig. 3). The threaded end 48 on a sleeve 50 passes through the aligned openings 44 and 46, and the three parts are firmly connected into a unitary assembly by means of nuts 52 which bear against the outer faces of the plates 42. Fig. 1 illustrates the normal position of the diaphragm 28.

One of the drum sections 24 is provided with an opening 54 through which the sleeve 50 extends. The opening 54 is larger than the outer diameter of the sleeve 50 to permit free relative movement of the sleeve. Within the sleeve 50 we slidably mount a valve element 56 in the nature of a tube which may have communication with the power unit 18 to the left of the diaphragm 28 when viewing Fig. 1 through the medium of an opening 57. The opening 57 is normally covered by the sleeve 50, but the valve element 56 may be shifted inwardly of the sleeve 50 for positioning the opening 57 beyond the inner end of the sleeve 50. Valve element 56 includes a neck 58 to which the flexible conduit 20 is connected for establishing communication between the power unit and the intake manifold of the vehicle.

In the outer wall of the valve element 26 we provide a groove 60 which has communication with an air bleed 62 in the sleeve 50 in the normal position of the parts, as illustrated in Figs. 1 and 3. Because of such communication between the air bleed 62 and the groove 60, suction incident to the intake manifold is rendered inoperative with respect to the diaphragm 28 until the air bleed is moved out of registration with the groove and the opening 57 shifted beyond the inner end of the sleeve 50.

The linkage 22 comprises a lever 64 having branches 66 at its upper end slotted at 68 to receive pins 70 fixedly connected with the valve element 56. In Fig. 3, we illustrate the pins 70 as having threaded relation with the valve element 56 for connection purposes.

The lower end of the lever 64 terminates in an offset plate 72 having a bored enlargement 74 arranged with its ends between bored abutments 76 formed integrally with a plate 78 carried by a power lever 80. Plate 72 is pivotally connected with the abutments 76 through the medium of a shaft 82 which extends through the aligned openings in the abutments 76 and the enlargement 74. The lever 64 actuates the valve element 56 for setting the power unit 18 into operation while the power lever 80 constitutes a mechanical connection between the power unit and the brake pedal 10 for brake applying purposes.

The U-shaped bracket 84 has its bight 86 welded to one of the drum sections 24, and the lever 80 is positioned between the reaches of the bracket and pivotally connected thereto by a bolt 88. On the upper end of the lever 80 we mount a spring unit 90, which, in turn, is connected with the sleeve 50 for pivoting the lever 80 about its axis 88 when the diaphragm 28 is shifted. The spring unit 90 comprises a single piece of spring wire bent to provide a U-shaped part 92 which embraces the lever 80. The wire is convoluted at 94 and mounted upon a pin 96 carried by the lever 80 while the convolutions 94 terminate in reaches 98 looped for connection with pins 100 having threaded relation with the sleeve 50 (see Figs. 3 and 4).

The spring unit 90 is so shaped as to maintain the plate 78 in slight pressure relation with the head 102 of the brake pedal in the normal position of the brake pedal. Since the normal pressure relation between the lever 80 and the brake pedal 10 is infinitesimal, the tension of the spring unit 90 in the normal position of the parts will not cause any depression of the brake pedal 10, which pedal may be yieldingly supported in the normal position of Fig. 1 by a spring 104 having one end connected with the pedal 10 and its opposite end fixedly connected with any suitable anchorage on the vehicle. Such springs are well known in the art and need not be described in further detail.

Between the plates 72 and 78 we mount a compression spring 106 which operates to maintain normal separation of the plates 72 and 78 in the manner illustrated in Fig. 1. In Fig. 3, the pins 100 have their inner ends lying within the grooves 108 in the valve element 56, the grooves being so located and of such length as to prevent outward movement of the valve element with respect to the sleeve 50 beyond the positions illustrated in Figs. 1 and 3.

In operation, pressure is applied to the plate 72 for compressing the spring 106. Because of the location of the pivot 82, a very slight compression of the spring 106 shifts the upper end of the lever 64 sufficiently far to bring the opening 62 out of registration with the groove 60 and the opening 57 to a position beyond the inner end of the sleeve 50. As the lever 64 moves in the direction of its dotted line illustration 110, the power lever 80 remains in the full line position of Fig. 1 until the suction of the intake manifold has been made effective on the diaphragm 28.

Movement of the diaphragm 28 in the direction of its dotted line position carries with it the sleeve 50. Such shifting of the sleeve tends to flex the spring unit 90 which, in turn, exerts a pull on the power lever 80 for moving it in the direction of its dotted line position of Fig. 1, thus operatively connecting the power unit 18 with the brake pedal 10 for brake applying purposes. Movement of the sleeve 50 with the diaphragm 28 is relative to the valve element 56 so that the air bleed 62 will again communicate with the groove 60, and the opening 57 will again be covered by the sleeve 50. The spring unit 90 is sufficiently stiff to transmit the desired brake applying forces to the power lever 80, but as these forces exceed the critical value of the spring unit, continued flexing of the spring unit cuts off the communication between the intake manifold and the power unit.

Further compression of the spring 106 will again pivot the lever 64 about its axis 82 for establishing communication between the intake manifold and the power unit. Thus, the brake applying forces of the power unit 18 may be continued in stages within the total range of adjustment of the brake pedal 10. Release of manual pressure on the plate 72 with the brakes applied in any degree will bring about registration between the groove 60 and the bleed 62 and closure of the opening 57 for rendering the power unit 18 inoperative.

In Figs. 6 to 9, inclusive, we illustrate a different form of construction which may be located within the vehicle in the same manner as the previously described system, but in which a pendulum valve is interposed in the system for setting the power unit in operation in response to negative acceleration of the speed of the vehicle. In Fig. 6, the power unit 210 includes a clamp 122 for connection with the steering post 124 in the same way as the power unit 18. The power unit 120 comprises sections 126 and 128 flanged at 130 for connection purposes as well as for mounting the diaphragm 132. Section 126 includes a relatively large opening 134 for accommodating a rod 136 having one end fixedly connected with the diaphragm 132 and its opposite end pivotally connected at 142 with the section 126 of the brake unit. Lever 140 includes a shaft 144 slidably mounted in a tube 146 pivotally connected at 148 with the head 150 of the brake pedal 152. The brake pedal is conventional and is operatively connected with the usual rod 154 associated with the brakes, not shown. Brake pedal 152 is pivotally mounted at 156 in the same way as the brake pedal 10 and includes a spring 158 corresponding to the spring 104.

Section 128 of the power unit 120 communicates with a cylinder 160 through the medium of a conduit 162. One end of the cylinder 160 is clamped in a band 164 having a right-angular bend 166 attached to the vehicle wall 168 by bolts 170. A conduit 172 establishes communication between the cylinder 160 and the intake manifold, not shown.

In Fig. 8, we illustrate the cylinder 160 as being provided with a piston 174 having a slot 176 normally aligned with a slot 178 in the wall of the cylinder. Fig. 8 ilustrates the normal position of the piston, at which time the port 180 communicating with the conduit 172 is closed. A partition 182 is provided in the piston, which is otherwise tubular, and one end of the piston is closed by a plate 184. The piston may be counterbored at 186 (see Fig. 9) for the reception of the plate 184, which plate is made secure by bending the material of the piston over the plate, as at 188.

Two slots 190 are provided in the piston 174 to accommodate a shaft 192 passing through openings 194 in the cylinder 160 and riveted as at 196. Because of the slots 190, the piston is free to move within predetermined limits relative to the fixed shaft 192. Upon the shaft 192 we rotatably mount an actuating element 198 having cam elements 200 and 202 arranged in contact with the inner face of the plate 184. The actuating element 198 is formed integrally with an arm 204 which, in turn, carries a weight 206. We slot the piston 174 at 208 and the cylinder 160 at 210 to accommodate the arm 204. A slot 212 is provided in the upper part of the piston 174 for accommodating the cam member 202.

A spring 214 is mounted inside the cylinder 160 with one end abutting the plate 184 and its opposite end abutting a plug 216 having threaded relation with the cylinder. The spring exerts a slight pressure on the plate 184 so as to prevent accidental shifting of the piston 174 to the right when viewing Fig. 8. Since the plate 184 engages both cams 200 and 202 in the position of Fig. 8, shifting of the piston in the opposite direction is prevented since the pressure relation between the two cams and the plate is balanced.

In operation, the brake pedal 152 may be depressed in the usual manner. With the brakes applied to a sufficient degree to cause negative acceleration of the vehicle, the weight 206 is caused to swing in the direction of travel, which causes the cam 202 to advance the piston 174 to the right when viewing Fig. 8 for uncovering the port 180. After port 180 is uncovered, communication is established between the power unit 120 and the intake manifold, at which time the power unit is set in operation for brake applying purposes.

Any pull on the shaft 136 connected with the diaphragm 132 causes a pivotal action of the lever 140 which, in turn, shifts the shaft 144 for applying pressure to the brake pedal 152. The telescopic relation between the shaft 144 and the tube 146 provides accommodation for variable spacing between the axes 142 and 148 incident to adjustment of the brake pedal. Slight shifting of the piston 174 from the normal position of Fig. 8 brings the slots 176 and 178 out of registration so that the suction of the intake manifold is effective on the diaphragm 132. Communication between the intake manifold and the power unit 120 is maintained until the suction within the cylinder 160 is of a sufficient degree to move the piston 174 toward its normal position against the action of the weight 206. As the suction between the intake manifold and the power unit is cut off, communication can again be established upon further depression of the brake pedal 152 for again retarding the speed of the vehicle and setting the weight 206 in operation for establishing communication between the intake manifold and the power unit. The power unit 120 may be set in operation in stages within the adjusting range of the brake pedal 152.

Since two cams are employed, the cam 200 will be actuated for shifting the piston 174 in the same manner as the cam 202 in response to negative acceleration of the vehicle when moving in reverse. Thus, the power unit 120 is effective in both directions of travel of the vehicle.

In both forms of the invention the power unit is operatively connected with a brake pedal and brake mechanism of conventional design. The construction and arrangement are such as to permit the installation of the power unit without necessitating redesign of the brake pedal or the brake mechanism. Both forms are easily installed and are so located as to be easily accessible for adjustment and repair. According to Figs. 6 and 7, the head 150 may be provided with a lug 218 for pivotal connection with the tube 146. This lug may be welded or otherwise secured to the head 150.

Without further elaboration, the foregoing will so fully explain our invention that others may, by applying current knowledge, readily adapt the same for use under various conditions of service.

We claim:

1. The combination with a steering post and a brake pedal, of a power unit mounted on the steering post including a diaphragm, a hollow member fixedly connected with the diaphragm and having an opening, a tube slidable in said hollow member and having a groove normally communicating with said opening and the interior of the power unit, a suction line communicating with said tube, a power lever pivotally connected with the power unit intermediate its ends and having one end connected with said hollow member and its opposite end operatively related to said brake pedal, and a lever pivotally connected with the power lever and having one end connected with said tube for shifting the same, to move the groove therein out of registration with said opening for establishing communication between the suction line and the power unit, said last-named lever including a pressure element.

2. In a motor vehicle including an operator's compartment and a brake pedal, a power unit including a diaphragm located in said compartment, a suction line including valve means supported by the diaphragm and interposed in the suction line, an operating connection between the valve means and the brake pedal, and manually actuated control means for the power unit, said operating connection being arranged to press downwardly on the brake pedal when the manually actuated control means are actuated for brake applying purposes.

3. In a motor vehicle including a steering post and a brake pedal, a power unit including a diaphragm mounted on said steering post, a suction line including valve means carried by the diaphragm and interposed in the suction line, and an operating linkage between the valve means and said brake pedal for establishing communication between the suction line and the power unit when pressure is applied to the brake pedal, said operating linkage including a power lever and a valve means actuating lever pivotally connected with the power lever, said valve means actuating lever having an end overlying the brake pedal constituting a foot pressure element.

4. In a motor vehicle including a steering post and a brake pedal, a power unit including a diaphragm mounted on said steering post, a suction line including valve means carried by the diaphragm and interposed in the suction line, an operating linkage between the valve means and said brake pedal for establishing communication between the suction line and the power unit when pressure is applied to the brake, a power lever operatively associated with the brake pedal, and a resilient connection between the power lever and the diaphragm.

5. In a motor vehicle including an operator's compartment and a brake pedal, a power unit mounted on a fixed support inside the compartment including a diaphragm, a hollow member fixedly connected with the diaphragm and having an opening, a tube slidable in said hollow member and having a groove normally communicating with said opening and the interior of the power unit, a suction line communicating with said tube, a power lever pivotally connected with the power unit intermediate its ends and having one end connected with said hollow member and its opposite end operatively related to said brake pedal, and a lever pivotally connected with the power lever and having one end connected with said tube for shifting the same, to move the groove therein out of registration with said opening for establishing communication between the suction line and the power unit, said last-named lever including a pressure element.

6. In a motor vehicle including a brake pedal, a power unit including a diaphragm mounted on a fixed support, a suction line including valve means carried by the diaphragm and interposed in the suction line, an operating linkage between the valve means and said brake pedal for establishing communication between the suction line and the power unit when pressure is applied to the brake, a power lever operatively associated with the brake pedal, and a resilient connection between the power lever and the diaphragm.

7. In combination with an automotive vehicle brake lever, a power unit including a suction responsive element, a suction line connected with the power unit for actuating said suction responsive element, a valve comprising a housing operatively connected with said suction responsive element and a valve element movable in the housing for opening and closing the suction line, a yieldable foot actuated means operatively connected with said valve element for opening said suction line through shifting of the valve element relatively to said housing, and an operating connection between said housing and said brake lever for moving the latter to brake applying position, including yielding means coacting with said housing to yield on the application of a predetermined braking force on the brake lever to permit the housing to shift relatively to said valve element for closing the suction line.

8. In combination with an automotive vehicle brake lever, a power unit including a suction responsive element, a suction line communicating with the power unit for actuating said suction responsive element, a valve comprising a housing operatively connected with said suction responsive element and a valve element movable in the housing for opening and closing said suction line, a foot actuated means operatively connected with said valve element for opening said suction line through shifting of the valve element relatively to said housing, including a resilient element opposed by the brake lever and yieldingly resisting movement of the foot actuated means, and an operating connection between said housing and said brake lever for moving the latter to a brake applying position, including a spring interposed in said operating connection and coacting with said housing to yield on the application of a predetermined braking force to the brake lever to permit said housing to shift relatively to said valve element for closing the suction line.

9. In combination with an automotive vehicle brake lever, a relatively fixed drum having a suction responsive diaphragm, a suction line connected with said drum for actuating said diaphragm, a valve comprising a housing operatively connected with said diaphragm and a valve element movable in said housing for opening and closing said suction line, said valve normally maintaining communication between said drum and the atmosphere to permit said diaphragm to assume its normal position inside the drum, a foot actuated means operatively connected with said valve element for opening said suction line through shifting of the valve element relatively to said housing to create suction condition inside the drum for actuating the diaphragm, a spring opposed by said brake lever and operatively connected with said foot actuated means to yield upon the application of a predetermined force for shifting the valve element, and an operating connection between said housing and said brake lever for moving the latter to brake applying position when the diaphragm is actuated, including a spring interposed in said operating connection and coacting with said housing to yield upon the application of a predetermined braking force on the brake lever to permit the housing to shift relatively to said valve element for closing the suction line.

ELWYNE O. SHREFFLER.
AARON D. LESAGE.